United States Patent [19]
Stemper

[11] Patent Number: 5,807,007
[45] Date of Patent: Sep. 15, 1998

[54] MISALIGNMENT ACCOMMODATING CONNECTOR ASSEMBLY

[75] Inventor: Jack S. Stemper, Irvine, Calif.

[73] Assignee: The United States of America as represented by the Administrator of the National Aeronautics and Space Administration, Washington, D.C.

[21] Appl. No.: 786,843

[22] Filed: Dec. 19, 1996

[51] Int. Cl.⁶ ............................................. F16B 2/02
[52] U.S. Cl. ............................ 403/13; 403/157; 403/325
[58] Field of Search .............................. 403/13, 14, 154, 403/157, 150, 79, 325, 324, 321, 328, 322, 323, 354

[56] References Cited

U.S. PATENT DOCUMENTS

| | | | |
|---|---|---|---|
| 4,105,347 | 8/1978 | Gossage | 403/157 |
| 4,760,871 | 8/1988 | Vijay | 403/324 X |
| 4,822,197 | 4/1989 | DeMartino et al. | 430/154 |
| 4,929,113 | 5/1990 | Sheu | 403/157 |
| 5,135,330 | 8/1992 | Chen | 403/323 X |
| 5,335,522 | 8/1994 | Stadelmann et al. | 403/79 X |

FOREIGN PATENT DOCUMENTS

| | | | |
|---|---|---|---|
| 26895 | of 1910 | United Kingdom | 403/157 |
| 173367 | 1/1922 | United Kingdom | 403/354 |

*Primary Examiner*—Harry C. Kim
*Attorney, Agent, or Firm*—Hardie R. Barr

[57] ABSTRACT

Misalignment accommodating connector assembly for removably connecting first and second objects which may comprise: a first connector subassembly (10) having an arm member (11) extending therefrom transversely through which is provided a tubular member (12); a second connector subassembly (20) having a pair of spaced apart arm members (21,22) each of which is provided with a transversely disposed coaxially aligned semi-cylindrical recess (24,25) for receiving opposite ends of the first connector tubular member (12) upon lateral insertion of the first connector arm member (11) into the space (23) between the second connector pair of arm members (21,22). An axially extendable and contractible fastener subassembly (50) carried by the first connector tubular member (12) is extendable to allow insertion or removal of the first connector arm member (11) into or from the space (23) between the second connector pair of arm members (21,22) and contractible when the opposite ends of the tubular member (12) are substantially received by the semi-cylindrical recesses (24, 25) of the pair of spaced apart arm members (21,22) to lock the first and second connector subassemblies (10,20) together.

13 Claims, 2 Drawing Sheets

MISALIGNMENT ACCOMMODATING CONNECTOR ASSEMBLY

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

TECHNICAL FIELD

The present invention pertains to connector apparatus. More specifically, the present invention pertains to connector or joint apparatus for removably connecting or joining two objects. The connector apparatus of the present invention would be particularly suitable for connectors which need to be quickly removed and reinstalled in hostile and/or unusual environments and which need to accommodate for at least some misalignment.

BACKGROUND ART

Many objects are connected by connector or joint apparatus in such a way that the objects may be disconnected, removed from each other and eventually reconnected. For example, portable scaffolding, gantry cranes, and other structures may be so connected. More exotic and unusual structures which might utilize a connector for removably connecting two objects are space apparatus and underwater apparatus. For example, such apparatus may be embodied in a truss structure which is made up of a number of structural members attached in various manners. It may be necessary to provide access to the space surrounding such a truss by temporarily removing one of its structural members. This would require some type of disengageable connector device.

The same might be true for an underwater application such as the leg of an oil and/or gas drilling or production platform. In such a case, it might be necessary to access the interior of the leg to repair pipe or other equipment embraced thereby. Such an operation would be facilitated by temporarily removing one of the structural members of the leg.

There are, of course, many types of connectors for removably connecting two objects. Some are simple, easily and quickly connected and disconnected, and can withstand great loads. Not so for many others. Many such joints employ a two part connector in which a first connector part is provided with a single arm (tongue) for engaging a space between a pair of spaced apart arms (yoke) of a second connector part. These arms may be provided with coaxially aligned holes through which a pin or bolt may be inserted for holding the connector parts together and thus connecting the objects to which the respective connector parts are attached. Examples of such connectors may be seen in U.S. Pat. Nos. 4,822,197 and 4,929,113.

One of the problems associated with connectors, particularly connectors for connecting structural members in heavy equipment, is proper alignment of the parts for easy connection and disconnection. If the connector parts are not easily aligned, it is sometimes difficult to engage the connection. Also if the separate parts of the connector are under stress (tensile or compressive) to each other, it may not be easy to disconnect the connector. There are various causes of such misalignment. The objects to be connected by the connector may simply not be manufactured or installed within necessary tolerances. Furthermore, particularly in the case of unusual environments such as those encountered in outer space or underwater, thermal gradients and water current loads may result in structural members connected by such a connector being in tension or compression making it difficult or impossible to remove or reconnect such a connector.

Connectors of the prior art, while suitable for many uses, may not be suitable for connecting, disconnecting and reconnecting objects in apparatus and/or environments where substantial stress exists between the objects to be connected. In many situations, such as space exploration and underwater operations, the failure to disconnect and/or reconnect objects because of misalignment created by such stress may be extremely costly. Thus, connector apparatus for connecting, disconnecting and reconnecting such objects quickly, efficiently, reliably and with the required structural integrity is to be desired.

STATEMENT OF THE INVENTION

The present invention provides a connector assembly for removably connecting first and second objects. This allows the objects to be connected, disconnected and reconnected, if desired. The connector assembly of the present invention is particularly useful in connecting misaligned structural objects.

The connector assembly of the present invention comprises: a first connector subassembly, having an arm extending therefrom and transversely through which is provided a tubular member, and a second connector subassembly having a pair of spaced apart arm members each of which is provided with a transversely disposed coaxially aligned semi-cylindrical recess for receiving opposite ends of the first connector tubular member upon lateral insertion of the first connector arm member into the space between the second connector pair of arm members. An axially extendable and contractible fastener subassembly is carried by the first connector tubular member. Extension of the fastener subassembly allows insertion or removal of the first connector arm member into or from the space between the second connector pair of arm members. Contraction of the fastener assembly, when opposite ends of the tubular member are substantially received by the semi-cylindrical recesses of the pair of spaced apart arm members, locks the first and second connector subassemblies together.

In a preferred embodiment of the invention, each of the semi-cylindrical recesses of the second connector pair of arm members terminates in an outwardly flaring semi-frustoconical surface. A pair of guide inserts, each of which has a semi-cylindrical portion and a semi-frustoconical portion, is inserted into the semi-cylindrical recesses of the second connector pair of arm members. The fastener subassembly includes a threaded shaft or bolt and a corresponding internally threaded portion or nut for coaxial disposition within the first connector tubular member. Carried at opposite ends of the bolt are a pair of locking members each of which is provided with outwardly flaring frustoconical portions.

With the fastener subassembly axially extended, the first connector arm member may be inserted into the space between the second connector pair of arm members so that the opposite ends of the tubular member are substantially received by the semi-cylindrical portion of the pair of guide inserts in the semi-cylindrical recesses of the second connector pair of arm members. Rotation of the fastener subassembly bolt, relative to the nut, then effects contraction of the fastener assembly causing the locking members thereof to be drawn toward each other. As this occurs, the frustoconical portions of the locking members engage the semi-frustoconical portion of the second connector inserts, forcing the tubular member into coaxial alignment with the second connector semi-cylindrical recesses and locking the first and second connector subassemblies together.

If it is desired to disconnect the connector assembly and the objects connected thereby, the fastener subassembly is extended simply by rotating the bolt thereof in an opposite direction, allowing the locking members to extend and the frustoconical portions thereof to disengage the semi-frustoconical surfaces of the second connector inserts. This then allows the first connector arm member to be removed from the space between the second connector pair of arm members, disconnecting the connector assembly or joint and the objects connected thereby. Subsequently, the connector assembly can be reengaged to reconnect the objects previously connected thereby. Even if the connector subassemblies are not perfectly aligned, they can be drawn or forced into proper alignment by the cooperating frustoconical and semi-frustoconical surfaces provided on the first and second subassemblies, respectively.

There are a number of advantages of the connector assembly of the present invention. In the first place, it is relatively easy to connect and disconnect. To do so, an arm member of a connector subassembly is simply laterally inserted into the space between a corresponding pair of arm members of another connector subassembly. When properly inserted and received, a fastener subassembly is contracted so that frustoconical surfaces thereon engage corresponding surfaces carried by the second connector subassembly forcing the subassemblies and consequently the objects connected thereby into proper (coaxial) alignment and locking them together. Subsequent disconnection and reconnection is easily accomplished by manipulating the fastener subassembly for extension and contraction, respectively.

One of the most important features or aspects of the present invention is the ability of the connector assembly to properly align itself upon connection and reconnection. Very frequently, such connections or joints are not easily aligned upon connection or reconnection. This could be due to many factors. For example, the object connected thereby may be under various forms of stress (tensile or compressive) due to thermal stresses, deformation of associated members, improper manufacturing and/or installation, etc. The unique frustoconical and semi-frustoconical surfaces provided on the fastener subassembly and the second connector subassembly allows initial engagement of improperly aligned connector subassemblies. Then, the fastener assembly may be contracted so that the mutually cooperating frustoconical and semi-frustoconical surfaces force the subassemblies into proper alignment and lock them in proper alignment.

The components of the connector subassemblies are also relatively simple to manufacture, use and maintain. Connection and reconnection of the joint may be accomplished with a single tool, even in unusual or hostile environments such as outer space or underwater. Many other objects and advantages of the invention will be apparent from reading the description which follows in conjunction with the accompanying drawings.

BRIEF DESCRIPTION OF THE DRAWINGS

Details of the invention will be described in connection with the accompanying drawings in which.

DETAILED DESCRIPTION OF THE INVENTION

Figures 1, 2:
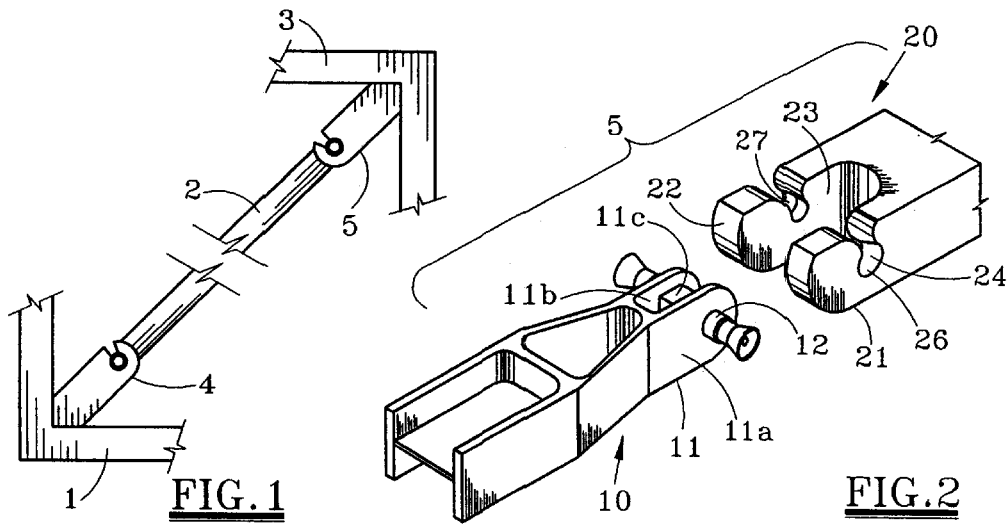
FIG. 1 is a schematic representation of two or more objects connected at a joint by a connector assembly, according to a preferred embodiment of the invention.
FIG. 2 is a perspective view showing subassemblies of a connector assembly, prior to connection thereof, according to a preferred embodiment of the invention.

Referring first to FIG. 1, there is shown structural members 1, 2 and 3 of a structure of some type, e.g. a truss, support leg, etc. For example the structure might be a truss-like structure utilized in space exploration, the structural support leg of an underwater drilling and/or production platform, the support leg of a gantry crane, etc. The uses could be many. For purposes of the present application, it is only necessary to appreciate that the structural member 2 may be connected to the frame members 1 and 3 by joint 4 and joint or connector assembly 5, which is the subject matter of the present invention and, which is shown in greater detail in FIGS. 2–5, as described hereafter.

The connector assembly 5 may comprise a first connector subassembly 10 and a second connector subassembly 20. These subassemblies 10,20 are fixed in some manner to first and second objects for removably connecting such objects. For example, the connector assembly 5 in FIG. 1 connects a structural beam 2 (first object) to the corner frame 3 (second object).

Figure 3:
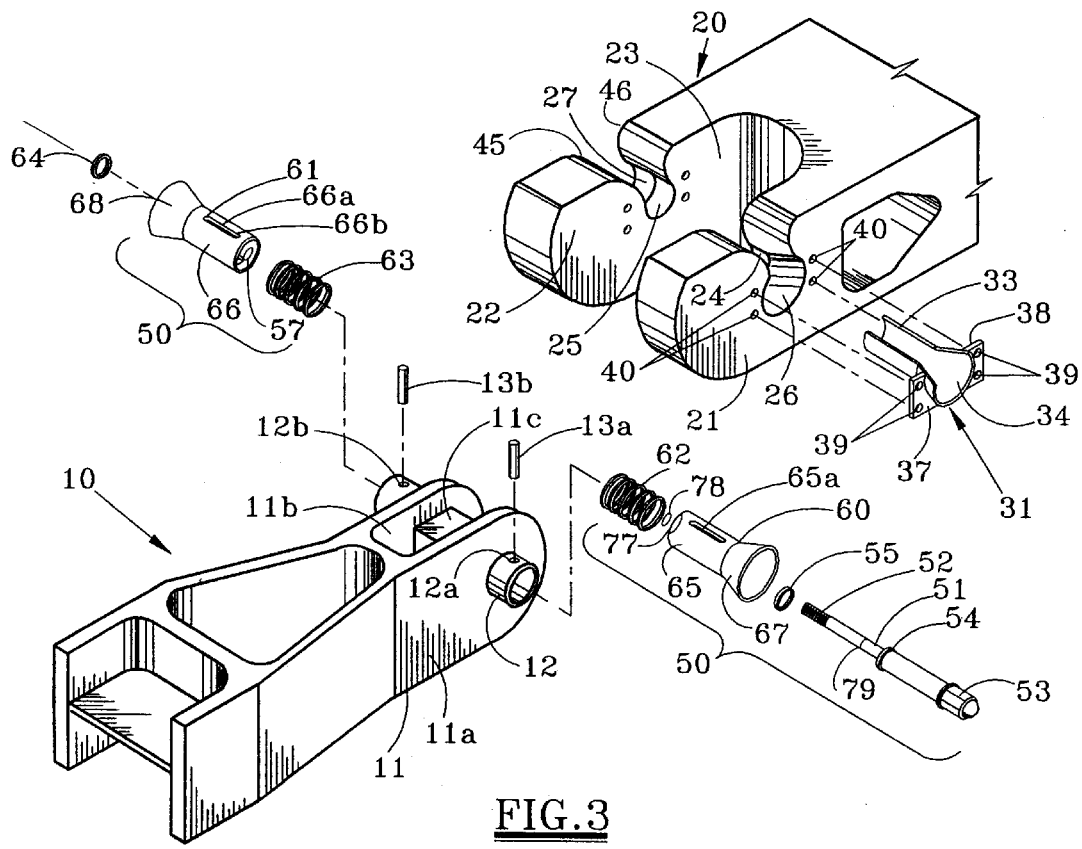
FIG. 3 is an exploded view, in perspective, of the connector assembly of the present invention.
Figure 4:
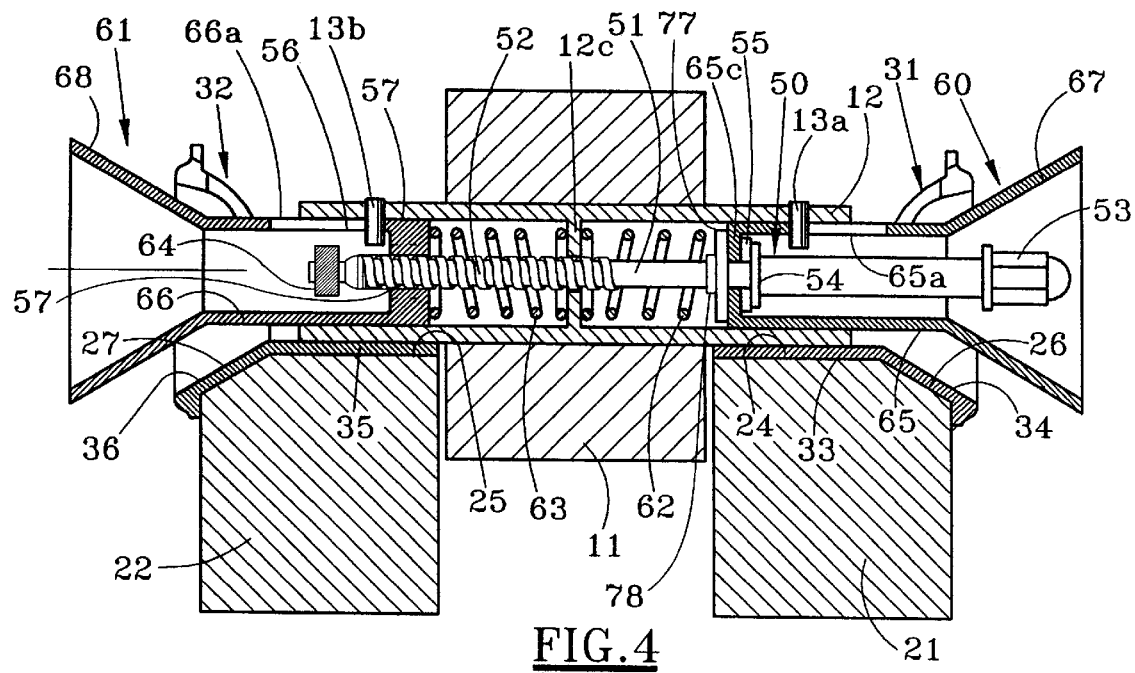
FIG. 4 is a sectional view of the connector assembly of the present invention in which the connector subassemblies are at least partially connected.

The first connector subassembly 10 may include an arm member 11 extending therefrom. The arm member 11 of FIG.'S 2 item 5 may be formed by a pair of plates 11a, 11b between which is welded a support block 11c, or the arm member 11 may be integrally manufactured. Passing through the arm member 11 is a tubular member 12 so configured that ends of the tubular member extend from opposite sides of the arm member 11 (see FIG. 3). Radial holes 12a and 12b are provided in the extensions to receive radial pins 13a and 13b, as best seen in FIGS. 3 and 4.

The second connector subassembly 20 which is affixed in some manner to the second object (for example, frame corner 3 as illustrated in FIG. 1) has a pair of arm members 21,22 spaced apart by a space 23. Each of the arm members 21,22 is provided with a transversely disposed coaxially aligned semi-cylindrical recess 24,25 generally for receiving opposite ends of the first connector tubular member 12 upon lateral insertion of the first connector arm member 11 into the space 23 between the pair of arm members 21,22, as best seen in FIG. 4. The outer ends of the each of the semi-cylindrical recesses 24 and 25 preferably terminate in outwardly flaring semi-frustoconical surfaces 26 and 27. Although it is not absolutely necessary, it is preferable that the semi-cylindrical recesses 24,25 and semi-frustoconical surfaces 26 and 27 be lined or provided with inserts such as inserts 31 and 32 (FIG. 4) which are provided with semi-cylindrical and semi-frustoconical portions 33,34 and 35,36, the external surfaces of which engage corresponding semi-cylindrical and semi-frustoconical surfaces 24,26 and 25,27 of the arms 21,22, respectively. As best seen with reference to insert 31 in FIG. 3, mounting plates 37 and 38 may extend from the semi-frustoconical portions 34,36 and be provided with holes 39 which correspond with holes provided in the arm members 21,22 (see holes 40 of arm 21) for engagement by, for example, threaded fasteners (not shown) to hold the inserts 31 and 32 in place. If the inserts 31 and 32 become worn or damaged, they may be removed and replaced without having to replace the entire connector subassembly 20.

It should be noted that the semi-frustoconical portions 34,36 of inserts 31 and 32 may actually provide more than the 180 degrees of surface implied by the prefix "semi". Thus as used herein, semi-cylindrical and semi-frustoconical is intended to incorporate not only 180 degrees of surface area but any surface area which will still permit lateral entry of the arm member 11 into the space 23 between arms 21 and 22 and to permit reception of the ends of the tubular member 12 in the semi-cylindrical portions of inserts 31 and 32 and/or the semi-cylindrical recesses 24,25 in which they are mounted. In fact, making the frustoconical portion 34,36 of the inserts 31,32 with surfaces greater than 180 degrees will provide an upwardly widening trough, formed between the surfaces 45 and 46 on arm members 21 and 22, for guiding the first connector subassembly 10 into proper engagement with the second connector subassembly 20. This construction will be more fully appreciated as described hereafter with reference to FIG. 5.

Carried within the tubular member 12 is an axially extendable and contractible fastener assembly 50. The fastener assembly 50 includes an elongated bolt 51 which is threaded on one end 52 and provided at the opposite end with a bolt head 53 suitable for engagement with a corresponding tool (not shown) for rotation thereof. An annular shoulder 54 is also provided on the bolt 51. A washer 55, washer 77, and retainer ring 78 engage and cooperate with the bolt 51 in assembly of the fastener subassembly 50 as best seen in FIG. 4.

Also forming a portion of the fastener subassembly 50 is a pair of locking members 60,61 a pair of springs 62,63 and a jam nut 64. Each of the locking members 60,61 is provided with a tubular cylindrical portion 65,66 and a frustoconical portion 67,68. Each of the cylindrical portions 65 and 66 is provided with a longitudinal slot 65a, 66a, respectively. The end of locking member 61 distal from the frustoconical portion is provided with an axial, internally threaded portion for receiving the threaded end of bolt 51.

The axially extendable and contractible fastener assembly 50 is assembled by first passing the bolt 51 through washer 55 and the first locking member 60 until the annular shoulder 54 and the washer 55 engage an annular shoulder 65c provided on the inner end of the cylindrical portion 65 of locking member 60. Washer 77 is then placed on bolt 51 so as to engage annular shoulder 65c on the side opposite washer 55. Retaining ring 78 is installed in retaining ring groove 79. The spring 62 is placed on the bolt 51 and the cylindrical portion 65 of the locking member 60 is inserted into tubular member 12. The spring 62 engages the annular shoulder 12c of the tubular member 12. A force is applied against the bolt head end 53 of the bolt 51, compressing the spring 62 until the guide pin 13a can be engaged with the slot 65a and radial hole 12b in the tubular member 12 preventing the locking member 60 from completely disengaging the tubular member 12 or from rotating therein.

As this assembly continues, the spring 63 is placed on the threaded end 52 of bolt 51 to rest against the annular shoulder 12c of the tubular member 12 and the other locking member 61 is internally received by the tubular member 12 and internal thread 57 of locking member 61 is engaged by the threaded end 52 of the bolt 51. Guide pin 13b is inserted into engagement with the slot 66a and radial hole 12b to prevent the locking member 61 from disengaging the tubular member 12 or rotating therein. The jam nut 64 is threaded on bold 51 to prevent disengagement of the bolt 51, once assembled. When so assembled, the fastener subassembly 50 appears as shown in FIG. 4 with the internal thread 57 and jam nut 64 at the threaded end 52 of the bolt member 51. The locking members 60 and 61 are biased outwardly by spring member 62 and 63 to their outermost extended positions such as shown in FIG. 4. With the fastener assembly 50 in this position, the connector assembly 5 is unlocked permitting the first connector arm member 11 to move laterally into or out of the space 23 between the pair of arm members 21 and 22 of second connector 20.

Figure 5:
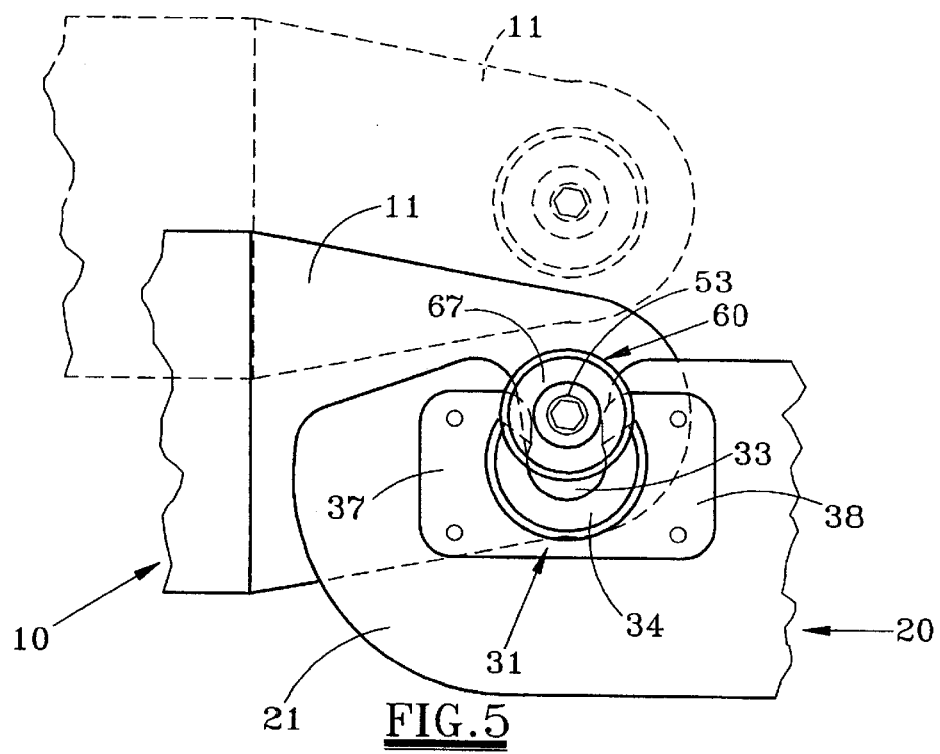
FIG. 5 is a side view of the connector assembly of the present invention illustrating partial, misaligned engagement of the subassemblies thereof.

Upon initial engagement, the arm member 11 would be moved into the space 23 until the ends of the tubular member 12 at least partially engage the semi-cylindrical recesses 24,25 or the inserts 31,32 received therein. The tubular member 12 and the locking members 60 and 61 would be guided toward this position by the trough-shaped lateral openings (formed between surfaces 45 and 46 of arm member 21 and similar surfaces of arm member 22) through the semi-frustoconical portions 34,36 of the inserts 31,32. FIG. 5 illustrates the lateral movement of arm 11 from the dotted line position to the solid line position. As may often be the case, the arm 11 might not be perfectly aligned with the arms 21,22; being misaligned, for example, by as much as several hundredths of an inch. Due to the uniqueness of the design of the present invention this is not a problem. Once the first and second connector subassemblies 10 and 20 are at least partially aligned, as in FIG. 5, the bolt head 53 of the fastener assembly may be engaged by a suitable tool and rotated, relative to the internal thread 57 and locking member 61, compressing springs 62,63 and drawing the locking members 60 and 61 together or toward a more contracted position. As this occurs the outwardly flaring frustoconical portions 67 and 68 of locking members 60,61 engage corresponding semi-frustoconical surfaces of the semi-frustoconical portion 34,36 of inserts 31 and 32. Continued rotation of the bolt member 51 continues to pull the locking members 60 and 61 together eventually forcing the tubular member 12, the bolt 51 and all of the components of the fastener assembly 50 into coaxial alignment with the cylindrical portions 33,35 of the inserts 31,32. When the bolt 51 has thus been rotated to its most snug position, the fastener means 50 is contracted to its most shortened position, locking the first and second connector subassemblies 10,20 together and thereby connecting the objects to which they are affixed in a snug joint, i.e. the joint 5 illustrated in FIG. 1.

After connection of such a joint, it may be necessary to disconnect the joint. For example, it may be necessary to remove the beam 2 from the frame corner 3 of FIG. 1 so that access would be provided to an area blocked thereby. In such a case, the connector assembly of the present invention would allow disconnection. This could be accomplished simply by engaging the bolt head 53 with a suitable tool and rotating it in the opposite direction so that bolt 51 would be fed toward the right (as viewed in FIG. 4) relative to internal thread 57 of locking member 61. As this occurs, the biasing force supplied by the retaining ring 78 would force the locking members 60 and 61 outwardly to the more extended positions shown in FIG. 4. When sufficiently extended, the fastener assembly 50 would allow the arm 11 to laterally disengage the space 23 between the second connector pair of arms 21,22, disconnecting the first and second connector subassemblies 10,20 and, consequently, the objects to which they are attached, such as the beam 2 and frame corner 3 of FIG. 1.

Thus, the connector apparatus of the present invention would permit connection of objects for subsequent disconnection and reconnection even when the objects are under stress and/or are misaligned. Connection and disconnection would be accomplished with a single tool in a simple, straightforward manner. This could be done in almost any environment, including space and under water.

Although a single embodiment of the invention has been described herein, many variations can be made without departing from the spirit of the invention. Thus, it is intended that the scope of the invention be limited only by the claims which follow.

I claim:

1. Misaligned accommodating connector assembly for removably connecting first and second objects, said connector assembly comprising:
    a first connector subassembly having an arm member extending therefrom transversely through which is provided a tubular member;
    a second connector subassembly having a pair of spaced apart arm members each of which is provided with a transversely disposed coaxially aligned semi-cylindrical recess for receiving opposite ends of said first connector tubular member upon lateral insertion of said first connector arm member into a space between said second connector pair of arm members; and
    axially extendable and contractible fastener means movably disposed within said first connector tubular member, extension of said fastener means allowing insertion or removal of said first connector arm member into or from said space between said second connector pair of arm members, contraction of said fastener means, when said opposite ends of said tubular member are substantially received by said semi-cylindrical recesses of said pair of spaced apart arm members, locking said first and second connector subassemblies together.

2. The connector assembly of claim 1 in which said fastener means includes an externally threaded bolt and corresponding internal thread disposed within one of a pair of locking members each of which is provided with outwardly flaring frustoconical portions, such that rotation of said bolt, relative to said internally threaded one of said pair of locking members, effecting said contraction of said fastener means, said locking members thereof being drawn toward each other and said frustoconical portions thereof forcing said tubular member into coaxial alignment with said semi-cylindrical recesses and locking said first and second connector subassemblies together.

3. The connector assembly of claim 2 in which each of said locking members is also provided with a tubular cylindrical portion which is concentrically received within said tubular member for inward and outward sliding movement therein.

4. The connector assembly of claim 3 in which said fastener means includes biasing means carried in said tubular member between said locking members, biasing said locking members outwardly and said fastener means toward an extended position.

5. The connector assembly of claim 3 including cooperating anti-rotation elements carried by said tubular member and said locking members to prevent rotation of said locking members within said tubular member.

6. The connector assembly of claim 5 in which said anti-rotation elements include a longitudinal slot in the tubular cylindrical portion of at least one of said locking members and a corresponding and mutually engageable element projecting radially inward from said first connector tubular member.

7. The connector assembly of claim 2 in which the outer ends of each of said semi-cylindrical recesses terminates in an outwardly flaring semi-frustoconical surface which is engageable with the outwardly flaring frustoconical surfaces of a corresponding one of said locking members to force said tubular member into said coaxial alignment with said semi-cylindrical recesses.

8. The connector assembly of claim 7 in which said second connector subassembly includes a pair of guide inserts, each of which has a semi-cylindrical portion and a semi-frustoconical portion insertable into said semi-cylindrical recesses, said semi-cylindrical portion of said inserts for receiving said outer ends of said first connector tubular member and said semi-frustoconical portion of said inserts for engagement with the corresponding frustoconical portion of said locking members upon said lateral insertion of said first connector arm member into the space between said second connector pair of arms and actuation of said fastener means.

9. The connector assembly of claim 8 in which the inside diameter of said semi-cylindrical portions of said guide inserts is slightly greater than the outside diameter of said first connector tubular member.

10. The connector assembly of claim 9 in which each of said locking members is also provided with a tubular cylindrical portion the outer diameter of which is slightly less than the inside diameter of said first connector tubular member for telescopic inward and outward sliding movement therein.

11. The connector assembly of claim 10 in which the minor outside diameter of said frustoconical portion of said locking members is substantially the same as the inner diameter of said first connector tubular member and the minor inside diameter of said semi-frustoconical portion of said guide inserts is substantially the same as the outside diameter of said first connector tubular member.

12. The connector assembly of claim 11 in which the said semi-cylindrical and semi-frustoconical portions of said inserts provide lateral openings through which said locking members may laterally pass upon said lateral insertion of said first connector arm member into the space between said second connector pair of arm members.

13. The connector assembly of claim 12 in which the lateral opening through said semi-frustoconical portion of said inserts provides an upwardly widening trough for guiding said locking members and said first connector tubular member toward engagement with said inserts.

* * * * *